United States Patent
Kanda

(10) Patent No.: US 7,424,607 B2
(45) Date of Patent: Sep. 9, 2008

(54) AUTHENTICATION DEVICE AND COMPUTER SYSTEM

(75) Inventor: Akitsugu Kanda, Yamato (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 10/785,975

(22) Filed: Feb. 26, 2004

(65) Prior Publication Data

US 2005/0102522 A1    May 12, 2005

(30) Foreign Application Priority Data

Nov. 12, 2003    (JP)    ............. 2003-382091

(51) Int. Cl.
*G06F 21/20*    (2006.01)
*G06F 21/22*    (2006.01)

(52) U.S. Cl. .............. 713/156; 726/2; 726/3; 726/4; 726/5; 726/14; 726/17; 726/21; 713/150; 713/154; 713/155; 713/170; 713/175; 713/176

(58) Field of Classification Search .......... 713/176
See application file for complete search history.

(56) References Cited

U.S. PATENT DOCUMENTS

| | | | |
|---|---|---|---|
| 6,754,829 B1 * | 6/2004 | Butt et al. ............ | 726/8 |
| 6,853,988 B1 * | 2/2005 | Dickinson et al. ....... | 705/75 |
| 7,114,070 B1 * | 9/2006 | Willming et al. ........ | 713/156 |
| 2002/0016925 A1 * | 2/2002 | Pennec et al. .......... | 713/201 |
| 2002/0157016 A1 | 10/2002 | Russell | |
| 2002/0174307 A1 | 11/2002 | Yoshida et al. | |
| 2003/0023665 A1 | 1/2003 | Matsunami et al. | |
| 2003/0191843 A1 * | 10/2003 | Balissat et al. ......... | 709/227 |
| 2004/0068631 A1 | 4/2004 | Ukeda et al. | |
| 2004/0111605 A1 * | 6/2004 | Weber ............... | 713/152 |
| 2004/0225897 A1 * | 11/2004 | Norton .............. | 713/201 |
| 2005/0010780 A1 * | 1/2005 | Kane et al. .......... | 713/182 |
| 2005/0027985 A1 * | 2/2005 | Sprunk et al. ........ | 713/171 |
| 2005/0177750 A1 * | 8/2005 | Gasparini et al. ...... | 713/201 |

FOREIGN PATENT DOCUMENTS

JP    2002215462    8/2002
JP    2004-349775 A    12/2004

* cited by examiner

*Primary Examiner*—Ayaz Sheikh
*Assistant Examiner*—Saoussen Besrour
(74) *Attorney, Agent, or Firm*—Mattingly, Stanger, Malur & Brundidge, P.C.

(57) ABSTRACT

To restrict actions such as spoofing and thereby prevent tapping and leakages of data by certifying whether or not each communication device such as a storage device on a communication line is to be connected to the communication line.

Upon receipt of a packet that contains an IP address in its IP header and stores a certificate in its certificate payload from a storage device 300, an authentication device 200 compares an IP address that is recorded in the certificate and the IP address that is recorded on the IP header of the packet. If the comparison results in a match of these IP addresses, the authentication device 200 can certify that the storage device 300 is a device for which a certificate issuing device 100 has properly issued the certificate.

3 Claims, 12 Drawing Sheets

*Fig.5*

For-Certification Packet

| IP Header | TCP/UDP Header | ID Payload | Certificate Payload | Signature Payload |
|---|---|---|---|---|

ID Payload ↑ IP Address
Certificate Payload ↑ Certificate
Signature Payload ↑ Digital Signature

*Fig.6*

Configuration Management Table

| Name of Storage Device | IP Address | FC Address | Remaining Capacity |
|---|---|---|---|
| ST1 | 202.11.178.1 | 1 | 100GB |
| ST2 | 202.11.178.2 | 2 | 200GB |
| : | : | : | : |

AUTHENTICATION DEVICE AND COMPUTER SYSTEM

BACKGROUND OF THE INVENTION

1. Field of the Invention

The present invention relates to a method of certifying a device that is connected to a network or the like.

2. Description of the Related Art

Conventional storage devices are generally connected to host computers and servers via SCSI interfaces. The storage devices of such configurations are disposed at relatively restricted locations due to their physical limitations on distances of connection with the SCSI interfaces. For this reason, their communication paths have been under secure environments.

However, storage devices of IP-SAN type or NAS type, which are becoming increasingly popular in recent days, typically connect to host computers and servers via common IP networks. There are thus possibilities that data may be theft by various spoofing devices on the networks. In other words, communication paths connecting the storage devices and other various devices are now far from being secure environments.

SUMMARY OF THE INVENTION

The purpose of the present invention is to solve the above-described problem and to restrict actions such as spoofing, thereby preventing tapping and leakages of data, by certifying whether or not each communication device such as a storage device on a communication line is to be connected on the communication line.

In order to solve the problem described above, the present invention provides an authentication device with the following configuration. The authentication device of the present invention certifies a communication device that is connected via a predetermined communication line. The communication device imports a certificate therein, which has been issued by a certification authority and contains address information of the communication device. The authentication device of the present invention includes: a receiving module that receives a packet including address information of a source of the packet and the certificate; and a certification processing module that validates whether or not the source of the packet is the communication device based on the address information of the source of the packet, which is included in the packet, and the address information that is recorded on the certificate in the packet.

According to the authentication device of the present invention, whether or not the communication device or the source of the packet is the one for which the certification authority has properly issued the certificate can be validated by comparing the address information of the source of the packet and the address information that is recorded on the certificate. This allows for restriction of actions such as spoofing, since the address that is used for the communication is very unlikely to coincide with the address that is recorded on the certificate even if the certificate has been improperly obtained by a spoofing device.

Examples of the certificate include a public key certificate that is based on X.509 recommendation by ITU (International Telecommunication Union). The public key certificate can record the address information of the communication device on its extension field. Examples of the address information include an IP address or a MAC address. The IP address is preferable, since the MAC address requires rewriting every time the packet goes through a router. Examples of the applicable communication device include a storage device, a personal computer, or a network device of every kind.

In the above-described configuration, the authentication device may import a public key of the certification authority therein; the certificate that is imported in the communication device may further include a digital signature of the certification authority that has been encrypted with a private key of the certification authority; and the certification processing module may further decrypt the digital signature of the certification authority, which is recorded on the certificate in the packet that has been received by the receiving module, with the public key of the certification authority, and may validate whether or not the certificate in the received packet is the one that has been issued by the certification authority based on a result of the decryption.

In the above-described configuration, whether or not the received certificate is the one that has been properly issued by the certification authority can be validated, which allows for restriction of actions such as spoofing with more certainty.

In the authentication device thus constructed, the certificate that is imported in the communication device may further contain a public key of the communication device; the packet may further include a digital signature of the source of the packet, which has been encrypted with a private key of the source of the packet; and the certification processing module may further decrypt the digital signature of the source of the packet, which is included in the packet that has been received by the receiving module, with the public key of the communication device that is recorded on the certificate in the received packet, and may validate whether or not the digital signature of the packet source coincides with a digital signature of the communication device based on a result of the decryption.

In the above-described configuration, whether or not the digital signature coincides with an owner of the certificate can be validated, which allows for restriction of actions such as spoofing with more certainty.

The above-described authentication device may further include a caching module that caches certificates that have been successfully validated by the certification processing module; and the certification processing module may not carry out the validation if the caching module caches therein the same certificate as the one in the packet that has been received by the receiving module.

This allows for simplification of the process of validation, since there is no need to carry out the above-described various validations for every session. Additionally, it is desirable to erase certificates that are cached in the caching module at regular intervals, so that validity of each certificate can be checked according to its need. Examples of timing to erase each certificate include timing at which a few days have passed after the caching of the certificate or at timing at which one to two days have passed after the disconnection of the last session.

The above-described authentication device may further include: a certificate retaining module that retains a second certificate, which has been issued by the certification authority and contains address information of the authentication device; and a transmitting module that transmits a packet including the address information of the authentication device and the second certificate. This enables authentication devices to certify one another.

The present invention may also provide a computer system with the following configuration. That is to say, the present invention provides a computer system including a plurality of storage devices and an authentication device. Each of the storage devices includes: a certificate retaining module that retains a certificate, which has been issued by a certification authority and contains address information of the storage device; and a transmitting module that transmits a packet including the address information of the storage device and the certificate. The authentication device includes: a receiving module that receives a packet including address information of a source of the packet and the certificate; and a certification processing module that validates the source of the packet based on the address information of the packet source, which is included in the packet, and the address information that is recorded on the certificate in the packet. Upon receipt of a notification of an output of data from one storage device to another storage device from the one storage device, the receiving module receives the packet from each of the one storage device and the another storage device. The certification processing module then validates each of the received packets, and if the validation is successful, notifies the one storage device of permission of the output of data.

In the computer system thus constructed, actions such as replication and migration of data are available only between the storage devices with properly issued certificates. This allows for restriction of tapping of data due to actions such as spoofing.

The present invention may also provide a computer system with the following configuration. That is to say, the present invention provides a computer system including a plurality of storage devices and an authentication device. Each of the storage devices includes: a certificate retaining module that retains a certificate, which has been issued by a certification authority and contains address information of the storage device; and a transmitting module that transmits a packet including the address information of the storage device and the certificate. The authentication device includes: a receiving module that receives a packet including address information of a source of the packet and the certificate; and a certification processing module that validates the source of the packet based on the address information of the source of the packet, which is included in the packet, and the address information that is recorded on the certificate in the packet. Upon receipt of a notification of an output of data from one storage device to one of other storage devices from the one storage device, the receiving module receives the packet from each of the one storage device and the one of other storage devices that has been selected based on a predetermined condition. The certification processing module then validates each of the received packets, and if the validation is successful, notifies the one storage device of the selected storage device and of permission of the output of data.

In the computer system thus constructed, one storage device can automatically select another storage device that has been properly certified by the authentication device, with no need to specify a destination of copy or move. Operations such as replication and migration of data are thus available in security.

In the computer system thus constructed, each of the storage devices may alternatively be a SAN type storage device. In this case, the certificate may also contain a fiber channel address of the storage device for which the certificate has been issued, and the certification processing module of the authentication device may validate each of the received packets, and if the validation is successful, may notify the one storage device of the fiber channel address of the selected storage device and of permission of the output of data.

SAN represents a storage area network. In the computer system thus constructed, operations such as replication and migration of data are available at high speed via the fiber channel.

In the present invention, any of the above-described various aspects may be combined or partly omitted as may be necessary. The present invention may also be actualized by a diversity of other applications, such as a method of certifying a communication device that is connected via a predetermined communication line and a computer program for causing a computer to certify a communication device that is connected via a predetermined communication line. The above-described various aspects are similarly applicable to either configuration.

The computer program may be computer data signals that are embodied in carrier waves. Alternatively, the computer program may be recorded on a computer-readable recording medium. Examples of the recording medium include flexible disks, CD-ROMs, DVD-ROMs, magneto-optic disks, memory cards, hard disks, and a variety of other computer readable media.

BRIEF DESCRIPTION OF THE DRAWINGS

FIG. 5 schematically illustrates the general configuration of a for certification packet;

FIG. 6 schematically illustrates one example of a configuration management table;

DESCRIPTION OF THE PREFERRED EMBODIMENTS

Figure 1:
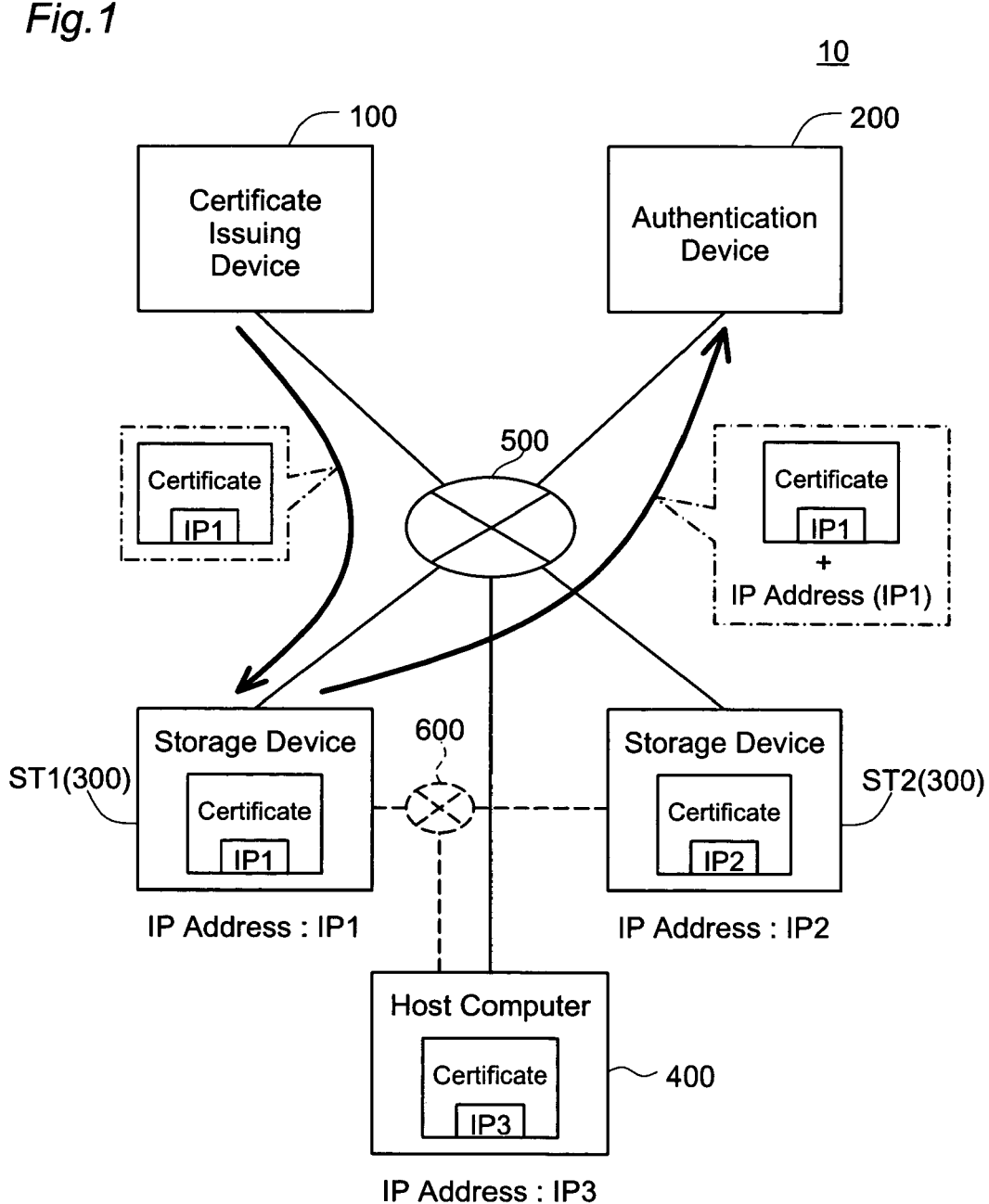
FIG. 1 schematically illustrates the general configuration of a computer system in accordance with one embodiment.

Preferred embodiments of the present invention are discussed below in the following order:
A. General Configuration of Computer System:
B. General Configuration of Each Device:
   (B1) Certificate Issuing Device:
   (B2) Authentication Device:
   (B3) Storage Device:
   (B4) Host computer:
C: Various Processes:
   (C1) Process of Issuing Certificate:
   (C2) Process of Certification:
   (C3) Process of Registering New Storage Device:
   (C4) Process of Certification Upon Communication:
   (C5) Process of Certification Upon Mounting:

A. General Configuration of Computer System:

FIG. 1 schematically illustrates the general configuration of a computer system 10 in accordance with one embodiment. The computer system 10 includes a certificate issuing device 100, an authentication device 200, storage devices ST1, ST2, and a host computer 400. These devices are interconnected via an IP network 500. In the following description, the storage devices ST1, ST2 may sometimes be referred to as the storage device 300 or the storage devices 300 with no distinction.

The certificate issuing device 100 is a so-called certification authority that issues a public key certificate (hereinafter referred to as "the certificate" for short) in response to a request from a device such as the storage devices 300 and the host computer 400 or an administrator of either device. The certificate is based on X.509 recommendation by ITU-T and contains in its extension field an IP address of a device for which the certificate has been issued. FIG. 1 shows an example where the certificate issuing device 100 issues a certificate, which contains an IP address (IP1) of the storage device ST1 therein, to the storage device ST1.

The authentication device 200 is a device for certifying each device on the IP network 500, including the storage device 300 and the host computer 400. The certification is mainly attained by comparing an IP address that has been recorded on a certificate upon the issuance of the certificate and an IP address of the each device. For example, as shown in FIG. 1, upon receipt of a packet that contains an IP address of a source of the packet in its IP header and stores the certificate therein from the storage device ST1, the authentication device 200 compares the IP address that is recorded on the certificate and the IP address of the source of the packet, which is recorded on the IP header of the packet. If the comparison results in a match of these IP addresses, the authentication device 200 can certify that the storage device ST1 is a device for which the certificate has been properly issued by the certificate issuing device 100.

The authentication device 200 can attain the above-described certification at a variety of timings. Examples of the timings include: (1) a timing at which a device such as the storage devices ST1, ST2 and the host computer 400 is newly connected to the IP network 500; (2) a timing at which the storage device ST1 replicates or migrates data to the storage device ST2; and (3) a timing at which the host computer 400 mounts the storage device 300. Having the authentication device 200 to attain the certification at these timings restricts tapping of data such as spoofing and thereby enables the computer system 10 to operate in security.

The storage device 300 is a NAS (Network Attached Storage) type storage device having a disk unit of large capacity. The host computer 400 may be a personal computer, a Web server, a data base server, or the like, which mounts the storage device 300 via the IP network 500 to store and read data. The host computer 400 can store and read data based on a protocol such as NFS or CIFS.

The storage device 300 is not necessarily of NAS type, but may be of other type such as IP-SAN type or SAN (Storage Area Network) type. If the storage device 300 is of IP-SAN type, the storage device 300 transmits or receives data to or from the host computer 400 based on a protocol called iSCSI. The iSCSI protocol allows for transmission and receipt of data based on SCSI commands on the IP network.

If the storage device 300 is of SAN type, the storage device 300 connects to the host computer 400 via a fiber channel 600 that is indicated by dashed lines in FIG. 1. In this case, input and output of data are attained via the fiber channel 600 based on a protocol such as serial SCSI-3. The storage device 300, however, still connects to the IP network 500 as well, since the storage device 300 has a variety of settings to be attained by a predetermined management device via the IP network 500. The above-described certificate is thus transmitted and received not via the fiber channel 600 but via the IP network 500 (a network for the settings), even if the storage device 300 is of SAN type. The storage device 300 is treated as a NAS type storage device in the following description, if not specified particularly.

Figure 2:
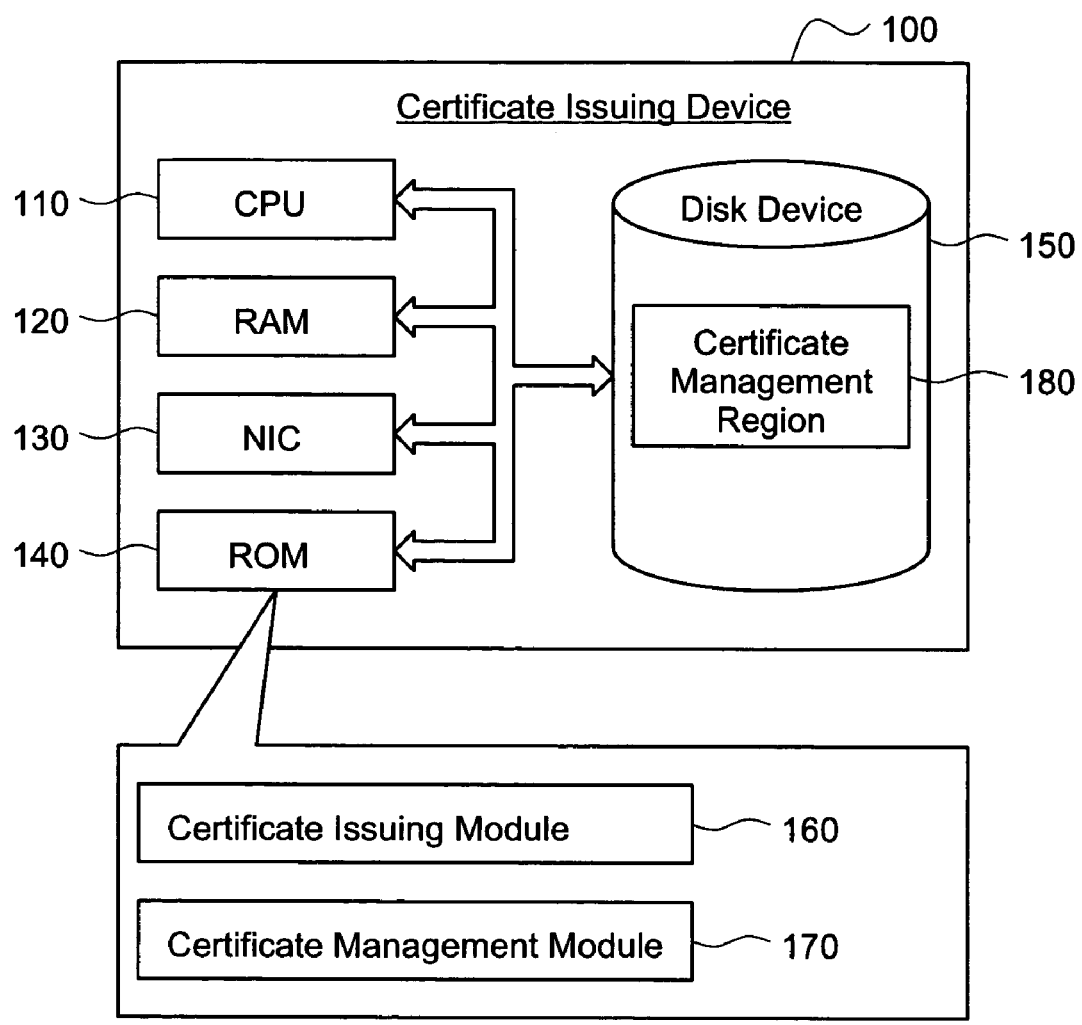
FIG. 2 schematically illustrates the general configuration of a certificate issuing device.

B. General Configuration of Each Device:

(B1) Certificate Issuing Device:

FIG. 2 schematically illustrates the general configuration of the certificate issuing device 100. The certificate issuing device 100 is configured as a computer having a variety of modules such as a CPU 110, a RAM 120, a NIC 130, a ROM 140, and a disk unit 150, all of which are connected together via a predetermined bus. The NIC 130 is a network interface controller that is used for communication with other devices via the IP network 500.

The ROM 140 records therein a control program for controlling the certificate issuing device 100. The CPU 110 executes such program by using the RAM 120 as its work area. Alternatively, the control program may be installed on the disk unit 150. The lower part of FIG. 2 shows functional blocks that are implemented as software by the control program.

Upon receipt of an issue request of certificate from other device via the IP network 500, a certificate issuing module 160 generates a certificate and transmits the certificate to the requester.

A certificate management module 170 manages certificates that have been issued already. For the management, the certificate management module 170 uses a certificate management region 180 in the disk unit 150. The certificate management module 170 manages, for example, owners of the already issued certificates, IP addresses of the owners, serial numbers and terms of validity of the certificates, and the like.

Figure 3:
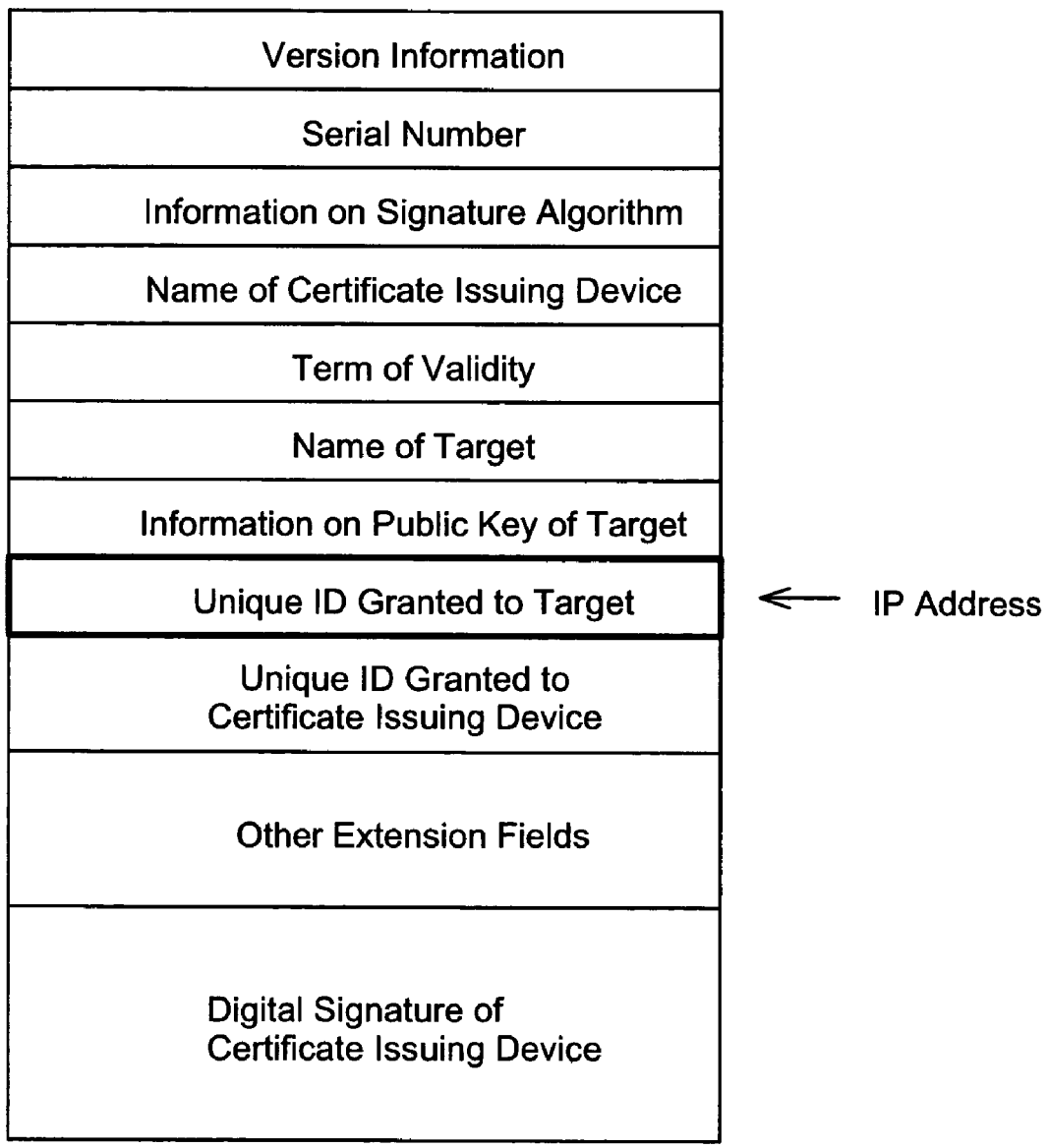
FIG. 3 schematically illustrates the format of a certificate.

FIG. 3 schematically illustrates the format of a certificate that is issued by the certificate issuing device 160. The certificate basically contains the following information therein: version information and a serial number of the certificate; information on signature algorithm; a name of the certificate issuing device; a term of validity; a name of a target of the certificate; information on a public key of the target; a unique ID that is granted to the target; a unique ID that is granted to the certificate issuing device; and a digital signature of the certificate issuing device. The certificate records these pieces of information according to the above-described X.509 recommendation. The certificate issuing device 160 records an IP address of the device that has requested the issuance of the certificate on a field for recording "a unique ID that is granted to the target" (hereinafter referred to as "the ID field.") If the certificate requesting device is a SAN type storage device, the field may record the fiber channel address as well.

Figure 4:
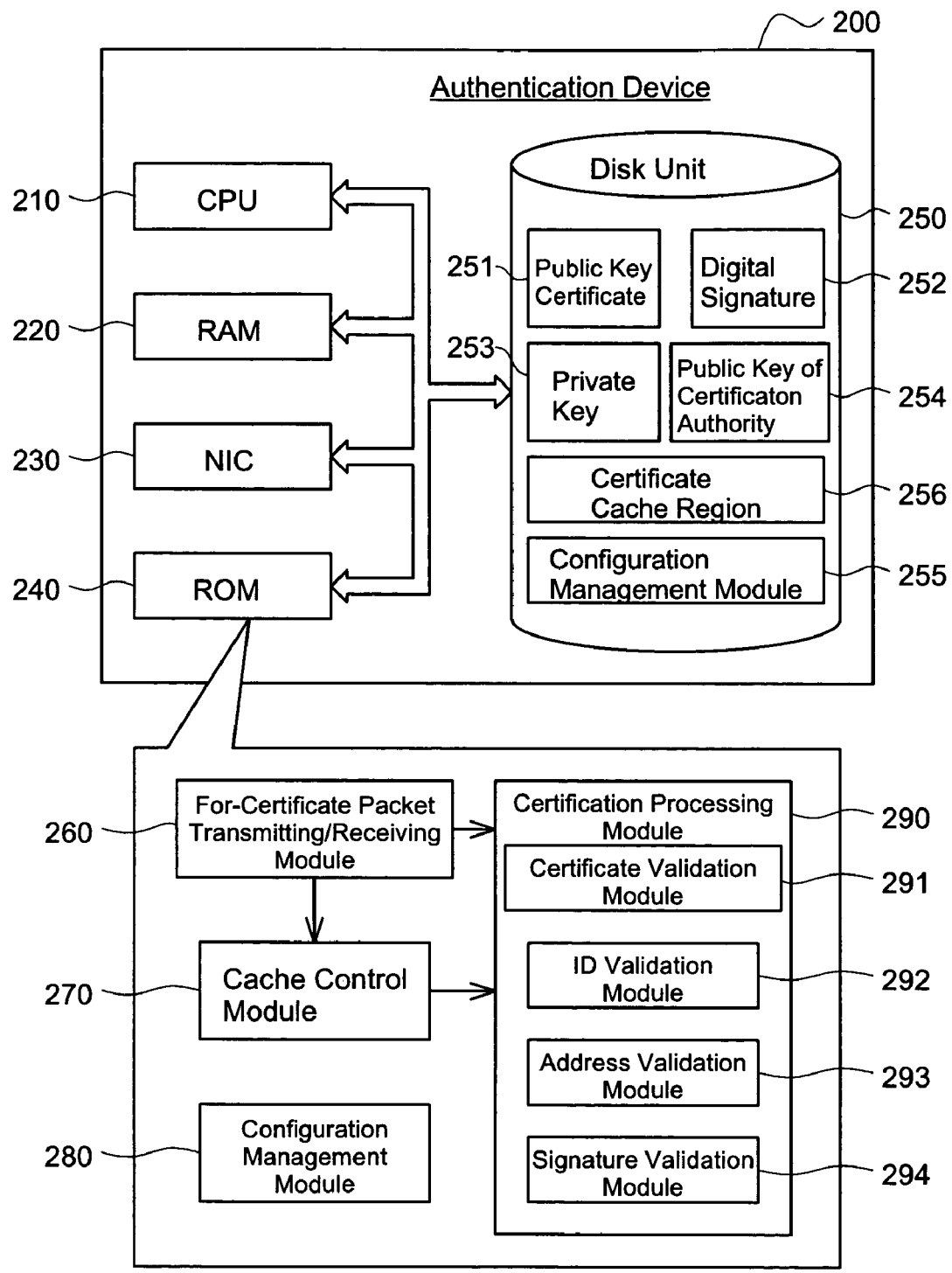
FIG. 4 schematically illustrates the general configuration of an authentication device.

(B2) Authentication Device:

FIG. 4 schematically illustrates the general configuration of the authentication device 200. The authentication device 200 is configured as a computer having a variety of modules such as a CPU 210, a RAM 220, a NIC 230, a ROM 240, and a disk unit 250, all of which are connected together via a predetermined bus.

The disk unit 250 contains: a public key certificate 251 of the authentication device 200, which has been issued by the certificate issuing device 100; a digital signature 252 and a private key 253 of the authentication device 200; and a public key 254 of the certificate issuing device 100. The disk unit 250 also has: a configuration management table 255 for managing the configuration of each storage device 300; and a certificate cache region 256 for caching certificates that have been received from the devices such as the storage devices 300 and the host computer 400.

The ROM 240 records therein a control program for controlling the authentication device 200. The CPU 210 executes such program by using the RAM 220 as its work area. Alternatively, the control program may be installed on the disk unit 250. The lower part of FIG. 4 shows functional blocks that are implemented as software by the control program.

A for-certification packet transmitting/receiving module 260 generates and transmits/receives a packet for certification (hereinafter referred to as "the for-certification packet"). The for-certification packet has a different structure from the packet for usual data communication. FIG. 5 schematically illustrates the general configuration of the for-certification packet. As shown in FIG. 5, the for-certification packet has an ID Payload, a certificate payload, and a signature payload, in addition to an IP header and a TCP/UDP header that are used for usual TCP/IP communication. The ID Payload, the certificate payload, and the signature payload stores an IP address, a certificate, and a digital signature of the source of the packet, respectively.

The cache control module 270 (FIG. 4) uses the certificate cache region 256 to cache certificates that have been received from the devices such as the storage devices 300 and the host computer 400. Each of the cached certificates is erased automatically at the time a predetermined period has passed since the certificate was cached. Erasing the cache on such periodic basis enables the certificate to be checked for its validity as may be necessary. Examples of the timing to erase the cached certificate include a few hours later and one to two weeks later. Another example of the timing to erase the cached certificate may be at the time when one to two days have passed since a session that is based on the certificate was terminated.

A configuration management module 280 uses the configuration management table 255 to manage the configuration of each storage device 300. FIG. 6 schematically illustrates one example of the configuration management table. As shown in FIG. 6, the configuration management table contains an identifier and an IP address of each storage device 300, and if the storage device is of SAN type, the table also contains a fiber channel address (a FC address) of the storage device 300 as well. As shown in FIG. 6, the table may also record therein a remaining capacity of the disk unit of each storage device 300.

A certification processing module 290 (FIG. 4) analyzes the for-certification packet that has been received by the for-certification packet transmitting/receiving module 260 and certifies the source of the packet. In order to attain the certification, the certification processing module 290 includes a certificate validation module 291, an ID validation module 292, an address validation module 293, and a signature validation module 294.

The certificate validation module 291 validates the certificate that is stored in the certificate payload. The ID validation module 292 validates the IP address that is stored in the ID payload. The address validation module 293 validates the IP address of the source of the packet, which is recorded on the IP header. The signature validation module 294 validates the digital signature that is stored in the signature payload. Concrete ways for each validation will be described later. If the validation in every validation module is successful, the certification processing module 290 certifies the source of the for-certification packet as being a reliable device.

Figure 7:
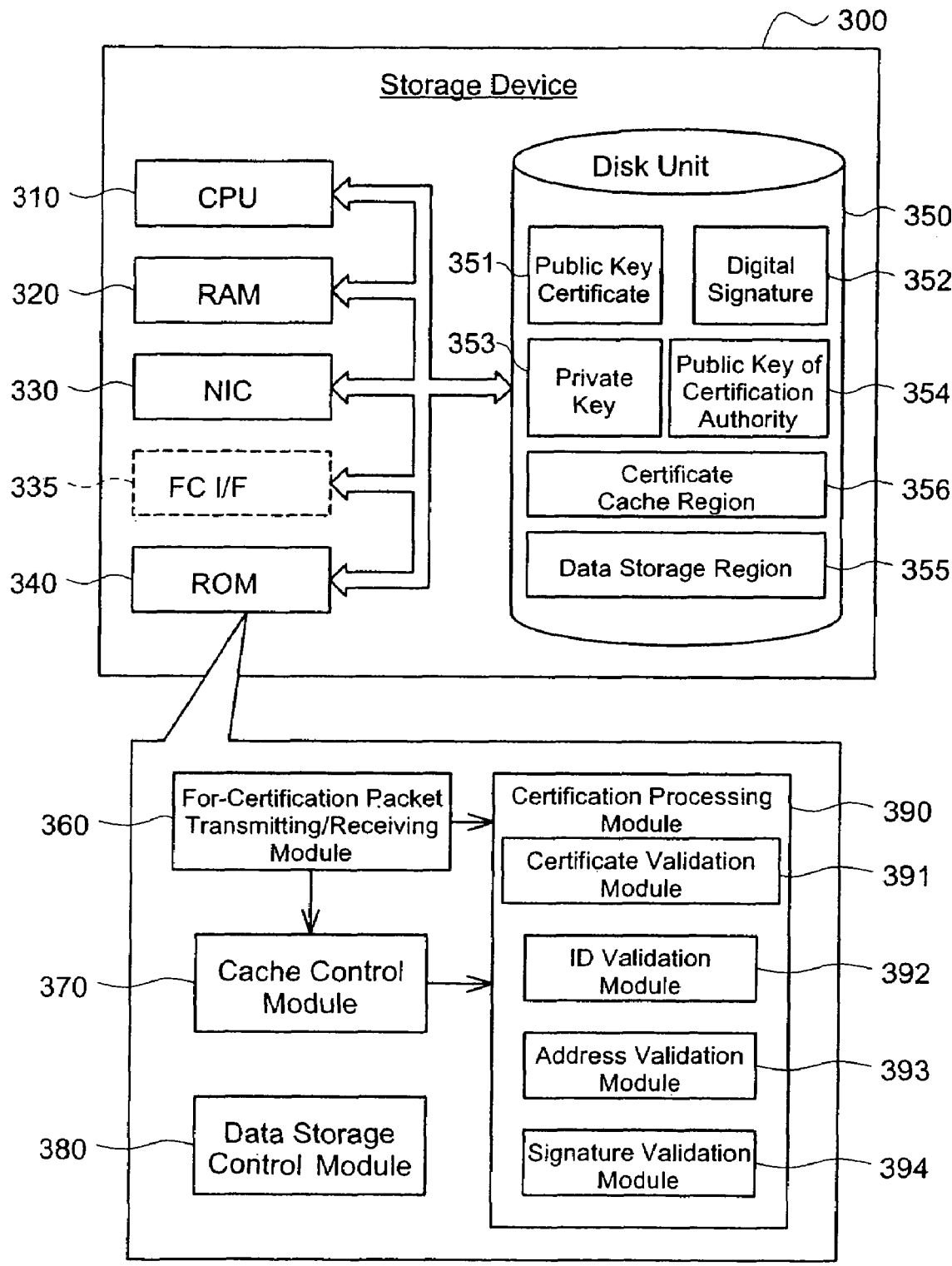
FIG. 7 schematically illustrates the general configuration of a storage device.

(B3) Storage Device:

FIG. 7 schematically illustrates the general configuration of the storage device 300. The storage device 300 has a variety of modules such as a CPU 310, a RAM 320, a NIC 330, a ROM 340, and a disk unit 350, all of which are connected together via a predetermined bus. If the storage device 300 is of SAN type, the bus also connects to a fiber channel interface 335 that is indicated by dashed lines in FIG. 7. The fiber channel interface 335 is an interface for establishing communication via the host computer 400 and fiber optics.

The disk unit 350 contains a data storage region 355 for storing output data from the host computer 400. The disk unit 350 also contains: a public key certificate 351 of the storage device 300, which has been issued by the certificate issuing device 100; a digital signature 352 and a private key 353 of the storage device 300; and a public key 354 of the certificate issuing device 100. The disk unit 350 also contains a certificate cache region 356 for caching certificates that have been received from other devices.

The ROM 340 records therein a control program for controlling the storage device 300. The CPU 310 executes such control program by using the RAM 320 as its work area. Alternatively, the control program may be installed on the disk unit 350. The lower part of FIG. 7 shows functional blocks that are implemented as software by the control program.

A data storage control module 380 stores or reads data into or from the data storage region 355 according to each request from the host computer 400 or the like. The data storage control module 380 also has a function of executing replication or migration of data in connection with another storage device 300. The replication is to make a copy of data into another storage device 300 and is a function that is capable of making redundant data. The migration is to cause a move of data into another storage device 300 and is a function that is capable of balancing disk usages of the storage devices 300.

A for-certification packet transmitting/receiving module 360 generates and transmits/receives a for-certification packet. The for-certification packet is generated by storing the IP address of the storage device 300, the certificate 351 that has been issued by the certificate issuing device 100, and the digital signature 352 that has been encrypted with the private key 353 of the storage device 300 into the ID payload, the certificate payload, and the signature payload, respectively. The IP address of the storage device 300 is also recorded on the IP header as the IP address of the source of the packet. If the storage device 300 is of SAN type, the ID payload may record therein a fiber channel address of the storage device 300 as well as the IP address.

Other functional modules in FIG. 7, i.e. a cache control module 370, a certification processing module 390, a certificate validation module 391, an ID validation module 392, an address validation module 393, and a signature validation module 394 function similarly as those in the authentication device 200 and thus are not described again.

Figure 8:
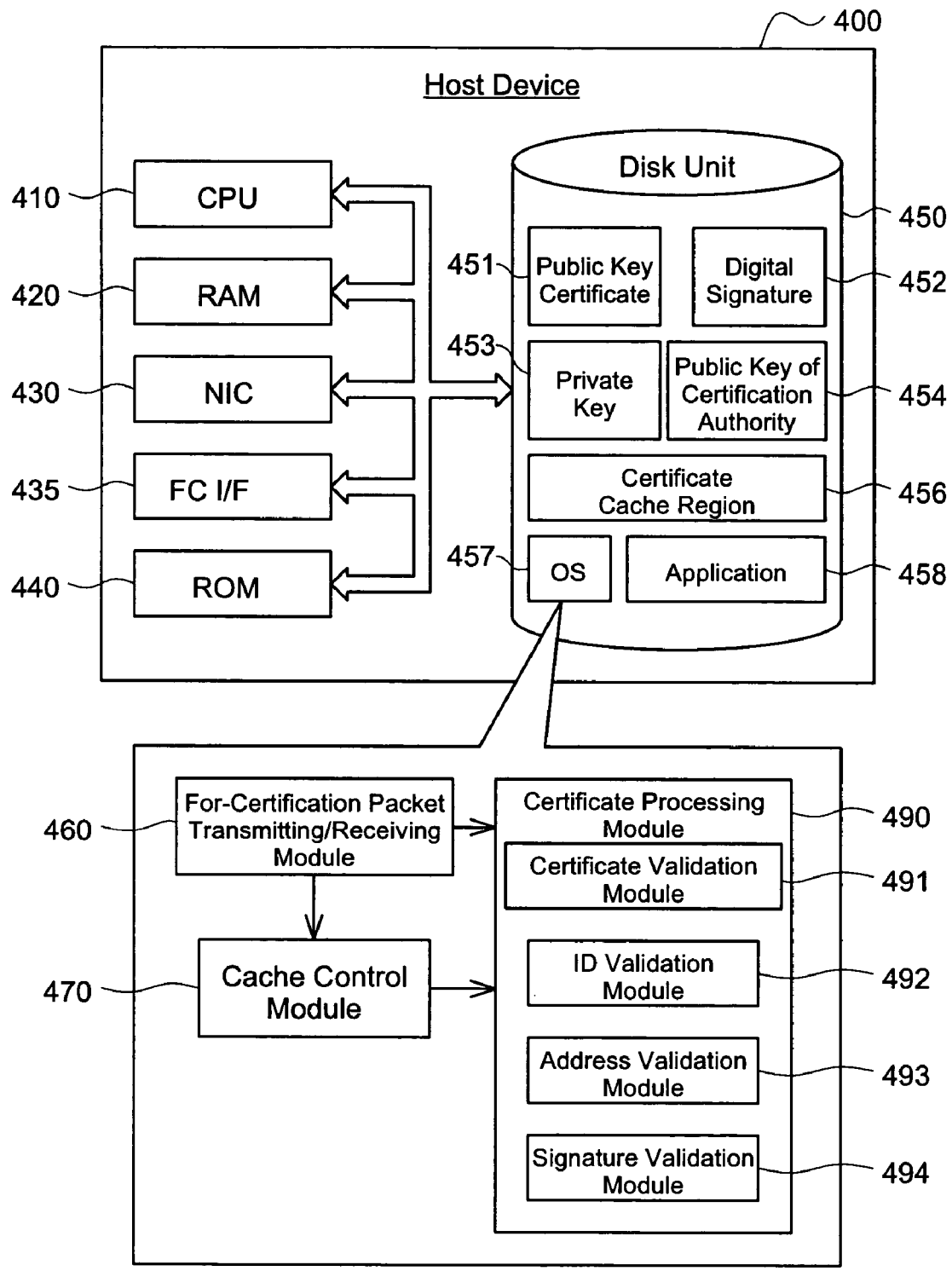
FIG. 8 schematically illustrates the general configuration of a host computer.

(B4) Host Computer:

FIG. 8 schematically illustrates the general configuration of the host computer 400. The host computer 400 is a computer having a variety of modules such as a CPU 410, a RAM 420, a NIC 430, a fiber channel interface 435, a ROM 440, and a disk unit 450, all of which are connected together via a predetermined bus. The fiber channel interface 435 is an interface that is used for connection of a SAN type storage device 300.

The disk unit 450 contains: a public key certificate 451 of the host computer 400, which has been issued by the certificate issuing device 100; a digital signature 452 and a private key 453 of the host computer 400; and a public key 454 of the certificate issuing device 100. The disk unit 450 also contains a certificate cache region 456 for caching certificates that have been received from other devices.

The disk device 450 further installs thereon an operating system 457 for controlling the host computer 400, an application program 458 for inputting or outputting data into or from the storage device 300, and the like. The CPU 410 executes these programs by using the RAM 420 as their work areas. Alternatively, these programs may be recorded on the ROM 440.

The operating system 457 incorporates a module for implementing as software a variety of functional blocks that are shown in the lower part of FIG. 8. Each of the functional module in FIG. 8, i.e. a for-certification packet transmitting/receiving module 460, a cache control module 470, a certification processing module 490, a certificate validation module 491, an ID validation module 492, an address validation module 493, and a signature validation module 494 function similarly as those in the authentication device 200 or those in the storage device 300 and thus are not described again.

In the present embodiment, each of the authentication device 200, the storage device 300, and the host computer 400 has its own certification processing module (290, 390, and 490). Accordingly, not only the authentication device 200 can certify the storage device 300 and the host computer 400, the storage devices 300 or the storage device 300 and the host computer 400 can also certify one another, for example.

Figure 9:
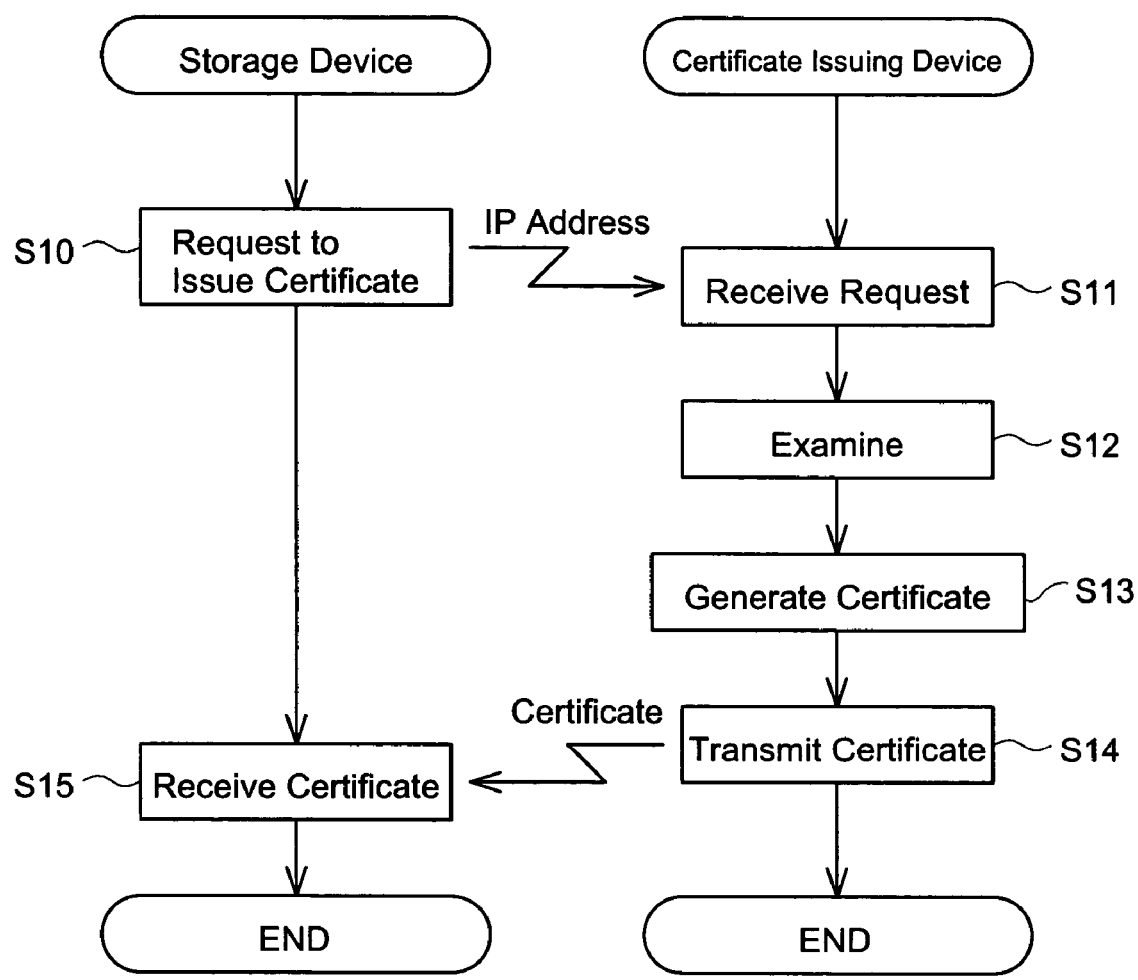
FIG. 9 is a flowchart illustrating a process of issuing certificate.

C: Various Processes:

(C1) Process of Issuing Certificate:

FIG. 9 is a flowchart illustrating a process of issuing certificate. The process of issuing certificate is executed each time a device such as the storage device 300, the host computer 400, and the authentication device 200 requests the certificate issuing device 100 to issue a certificate. The following describes a case where the storage device ST1 requests the certificate issuing device 100 to issue a certificate.

First of all, the storage device ST1 transmits an issue request of certificate to the certificate issuing device 100 in step S10. At this time, the storage device ST1 also transmits its own IP address together with the issue request.

Upon receipt of the issue request in step S11, the certificate issuing device 100 examines the storage device ST1 in step S12. The examination is attained based on a predetermined certificate issuing policy, and may be carried out automatically by the certificate issuing device 100 or may be carried out manually by an administrator of the certificate issuing device 100.

If the storage device 300 is judged to be a reliable device that can enroll in the computer system 10 as a result of the examination, the certificate issuing device 100 generates a certificate according to the format that is shown in FIG. 3 in step S13. At this time, the IP address of the storage device ST1 that has been received in the above-described step S11 is recorded on an ID field of the certificate. The certificate issuing device 100 then transmits the generated certificate to the storage device ST1 in step S14.

The storage device ST1 receives the certificate that has been transmitted from the certificate issuing device 100 in step S15, and imports the certificate into the disk device 350. In this way, the certificate issuing device 100 can issue a certificate to each device.

In the present embodiment, a device such as the storage device 300 and the host computer 400 directly requests the certificate issuing device 100 to issue a certificate. Alternatively, an administrator of the storage device 300 etc. may use another terminal device to provide an issue request of certificate. In this case, the administrator manually imports the issued certificate into the storage device 300 etc. In this case, not an IP address of the terminal device that is operated by the administrator but the IP address of the storage device 300 etc. that imports the certificate is transmitted to the certificate issuing device 100.

Figure 10:
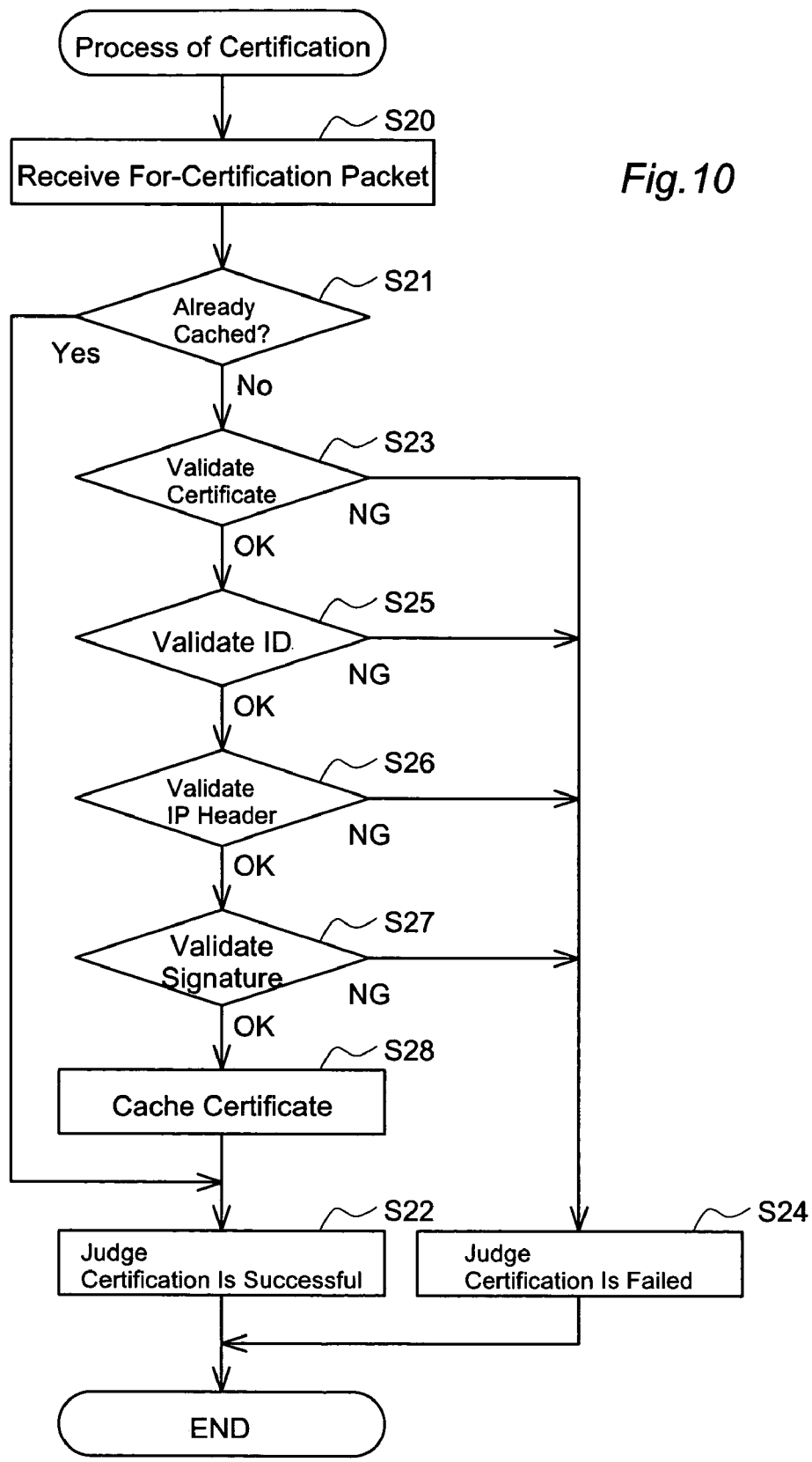
FIG. 10 is a flowchart illustrating a process of certification.

(C2) Process of Certification:

FIG. 10 is a flowchart illustrating a process of certification that is executed by the CPU 210 of the authentication device 200. The process of certification is a process that is executed by the authentication device 200 to certify a device such as the storage device 300 and the host computer 400 at the above-described variety of timings.

The CPU 210 receives a for-certification packet from a device such as the storage device 300 and the host computer 400 in step S20, and judges whether or not a certificate that is stored in a certificate payload of the received for-certification packet is already cached in the certificate cache region 256 in step S21. If the certificate is already cached, i.e. if YES is returned in step S21, the CPU 210 judges that the certification is successful in step S22.

If the certificate is not cached, i.e. if NO is returned in step S21, the CPU 210 validates the certificate that is recorded on the certificate payload in step S23. The validation is attained in the following order. First of all, the CPU 210 checks whether or not the digital signature of the certificate issuing device 100, which is recorded on the certificate, is falsified based on information that is recorded on an "information on signature algorithm" field of the certificate. Since the digital signature has been encrypted with the private key of the certificate issuing device 100, the CPU 210 decrypts the signature with the public key 245 of the certificate issuing device 100, which is retained in the disk unit 250. If the digital signature is not falsified and the decryption is completed normally, the CPU 210 considers that the validation is successful and thus proceeds to the next step. If the signature is falsified or the decryption is failed, i.e. NG is returned in step S23, the CPU 210 considers that the certification is failed and thus ends the process in step S24.

If the validation of the certificate is successful, i.e. if OK is returned in step S23, the CPU 210 further validates an ID payload of the for-certification packet in step S25. The validation is attained by comparing an IP address that is recorded on the ID payload and an IP address that is recorded on an ID field of the certificate. If the comparison results in a match of the addresses, it is considered that the source of the for-certification packet is a device for which the certificate has been properly issued. The CPU 210 thus judges that the validation is successful and proceeds to the next step. If the comparison results in a mismatch of the addresses, i.e. if NG is returned in step S25, there is a possibility that the certificate payload of the packet stores a theft certificate therein. In this case, the CPU judges that the certification is failed in step S24.

If the validation of the ID payload is successful, i.e. if OK is returned in step S25, the CPU 210 further validates an IP header of the for-certification packet in step S26. The validation is attained by comparing an IP address of the source of the packet, which is recorded on an IP header of the for-certification packet, and an IP address that is recorded on the ID field of the certificate. If the comparison results in a match of the addresses, it is considered that the for-certification packet has been transmitted through a proper route. The CPU 210 thus judges that the validation is successful and proceeds to the next step. If the comparison results in a mismatch, i.e. if NG is returned in step S26, there is a possibility that the IP header has been rewritten improperly or the certificate that has been properly issued to another device is being theft and used improperly. The CPU 210 thus judges that the certification is unsuccessful in step S24.

If the validation of the IP header is successful, i.e. if OK is returned in step S26, the CPU 210 further validates a digital signature that is recorded on a signature payload in step S27. The validation is attained by decrypting the digital signature that is recorded on the signature payload with a public key that is recorded on an "information on public key of the target" field of the certificate. At this time, the CPU 210 also checks whether or not the digital signature is falsified by using a commonly known hash algorithm. Since the digital signature that is recorded on the signature payload has been encrypted with a private key of the source of the packet, if the signature cannot be decrypted, there is a possibility that either the digital signature or the certificate is falsified or in theft. If the digital signature is falsified or cannot be decrypted, i.e. if NG is returned in step S27, the CPU 210 judges that the certification is failed in step S24. If the digital signature is not falsified and can be decrypted normally, the CPU 210 judges that the validation is successful and thus proceeds to the next step.

If all of the above-described four types of validations are successful, the CPU 210 caches the received certificate into the certificate cache region 256 in step S28, and judges that the certification is successful in step S22. The CPU 210 caches the certificate so that there may be no need to repeat the validations described above upon receipt of another for-certification packet that contains the same certificate therein.

According to the process of certification described above, the certification is a combination of the four types of validations. This enables the authentication device 200 to retain actions such as spoofing more powerfully. A variety of ID information can be used as the information to be recorded on the ID payload of the for-certification packet and the ID field of the certificate, as long as they can uniquely identify the target device of the certification. The IP address, however, is especially effective as the ID information. This is because the use of an IP address can effectively restrict actions such as spoofing from remote locations. For example, suppose a spoofing device, which belongs to a network domain that is different from the one to which the computer system 10 belongs, thieves a certificate that has been properly issued for a device in the computer system 10 and under a false IP address of the proper device transmits a for-certification packet to the authentication device 200, the for-certification packet may basically be blocked off by a router that connects the two domains, since the false IP address has an address architecture that is different from the one in the spoofing device's network domain.

Figure 11:
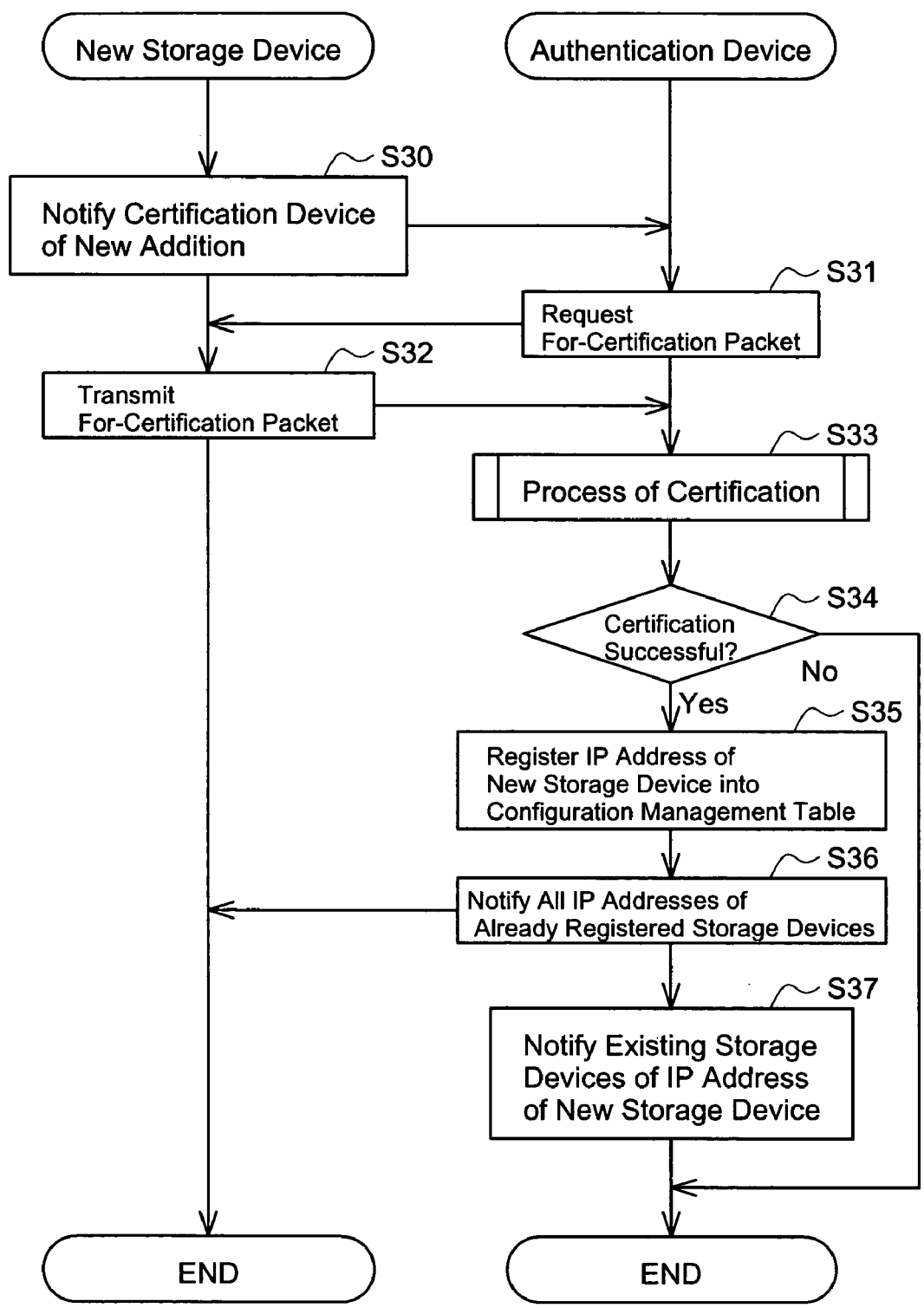
FIG. 11 is a flowchart illustrating a process of registering new storage device.

(C3) Process of Registering New Storage Device:

FIG. 11 is a flowchart illustrating a process of registering a new storage device. The process is executed when a new storage device 300 (hereinafter referred to as the new storage device N) is to enroll in the computer system 10.

Upon connection to the IP network 500, the new storage device N notifies the authentication device 200 of the new connection in step S30. Upon receipt of the notification, the authentication device 200 requests the new storage device N to transmit a for-certification packet in step S31. In response to the request, the new storage device N generates a for-certification packet and transmits the for-certification packet to the authentication device is 200, in step S32.

The authentication device 200 receives the for-certification packet and executes the process of certification that is described above in step S33. If the certification of the new storage device N results in a failure, i.e. if NO is returned in step S34, the authentication device 200 ends the process. The new storage device N is thus refused enrollment in the computer system 10.

If the certification of the new storage device N is successful, i.e. if YES is returned in step S34, the authentication device 200 registers an IP address of the new storage device N into the configuration management table 255 in step 35. The authentication device 200 then notifies the new storage device N of IP addresses of all of the storage devices that are already registered in the configuration table in step S36, and notifies all of the existing storage devices of the IP address of the new storage device N in step S37. This allows for operations such as replication and migration of data between the new storage device N and any of the existing storage devices. Previous to the notification of the IP address of the new storage device N to all of the existing storage devices in step S37, the authentication device 200 may also certify all of the existing storage devices by requesting their respective for-certification packets.

According to the process of registering new storage device described above, only new storage devices N with properly issued certificates can enroll in the computer system 10. This allows for restriction of tapping of data due to actions such as spoofing.

The similar process as that for registering new storage device is executed even if a new host computer 400 is to enroll in the computer system 10. This also applies to a case where the new storage device 300 is of SAN type. In this case, the authentication device 200 receives a fiber channel address of the new storage device N and registers the fiber channel address into the configuration management table. In this case, the notification of IP addresses in step S36, S37 may be omitted and alternatively a notification of permission of communication may be transmitted to the new storage device N. This is because the storage device of SAN type does not use its IP address to input and output data.

Figure 12:
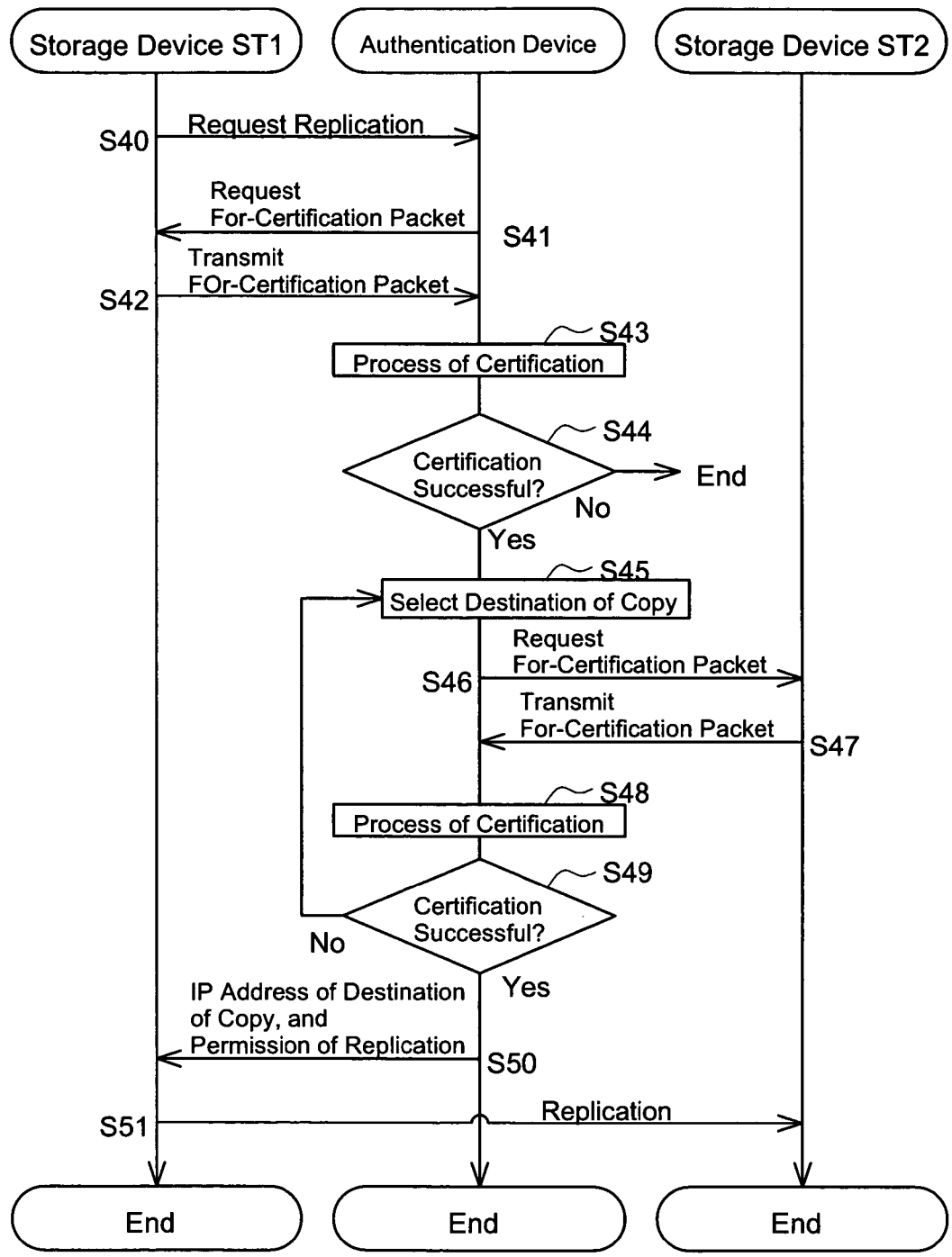
FIG. 12 is a flowchart illustrating a process of certification upon communication.

(C4) Process of Certification Upon Communication:

FIG. 12 is a flowchart illustrating a process of certification upon communication. The process of certification upon processing is executed when data is communicated between the storage devices 300. The following describes a case where the storage device ST1 replicates data into the storage device ST2. The similar process is executed even in case where the storage device ST1 migrates data into the storage device ST2.

Once the storage device ST1 transmits an execute request of replication to the authentication device 200 in step S40, the authentication device 200 requests the storage device ST1 to transmit a for-certification packet in step S41. The storage device ST1 then generates a for-certification packet and transmits the for-certification packet to the authentication device 200, in step S42.

Upon receipt of the for-certification packet from the storage device ST1, the authentication device 200 executes the process of certification that is described above with respect to FIG. 10 in step S43. If the certification of the storage device ST1 results in a failure, i.e. if NO is returned in step S44, the authentication device 200 ends the process of certification upon communication. In other words, the storage device ST1 is refused execution of the replication.

If the certification of the storage device ST1 is successful, i.e. if YES is returned in step S44, the authentication device 200 in a predetermined order selects one storage device from the storage devices that are registered in the configuration management table 255, in step 45. The predetermined order may be an ascending order of IP addresses or may be an increasing order of disk usages. The storage device ST2, for example, is selected in the present embodiment. The authentication device 200 requests the thus selected storage device ST2 to transmit a for-certification packet in step S46. In response to the request, the storage device ST2 generates and returns a for-certification packet in step S47.

Upon receipt of the for-certification packet from the storage device ST2, the authentication device 200 executes the process of certification that is described above with respect to FIG. 10 in step S48. If the certification of the storage device ST2 results in a failure, i.e. if NO is returned in step S49, the authentication device 200 returns to the step S45 and selects another storage device again. In this case, the authentication device 200 may unregister the certification-failed storage device from the configuration management table 255.

If the certification of the storage device ST2 is successful, i.e. if YES is returned in step S49, the authentication device 200 notifies the storage device ST1 of an IP address of the storage device ST2 and of permission of the replication in step 50. Upon receipt of such notification, the storage device ST1 replicates data into the storage device ST2 having the notified IP address in step S51.

According to the above-described process of certification upon communication, operations such as replication and migration of data are available only between the storage devices with properly issued certificates. This allows for restriction of tapping of data due to actions such as spoofing.

If the process of certification upon communication is executed between two SAN type storage devices, the authentication device 200 in step S50 may notify a fiber channel address of the storage device that has been selected in step S45, instead of the IP address of the storage device ST2. This allows the storage device ST1 to replicate data into the SAN type storage device corresponding to the notified fiber channel address.

In the above-described process of certification upon communication, it is the authentication device 200 that selects a storage device (ST2) to become a destination of the data replication. However, the storage device (ST1) that requests execution of the replication may alternatively designate a storage device to become a destination of the replication. In such case, the storage device ST1 may notify an IP address of a storage device to become a destination of the replication together with the execution request of replication in step S40, and the authentication device 200 may skip the step S45 of selecting a storage device.

Figure 13:
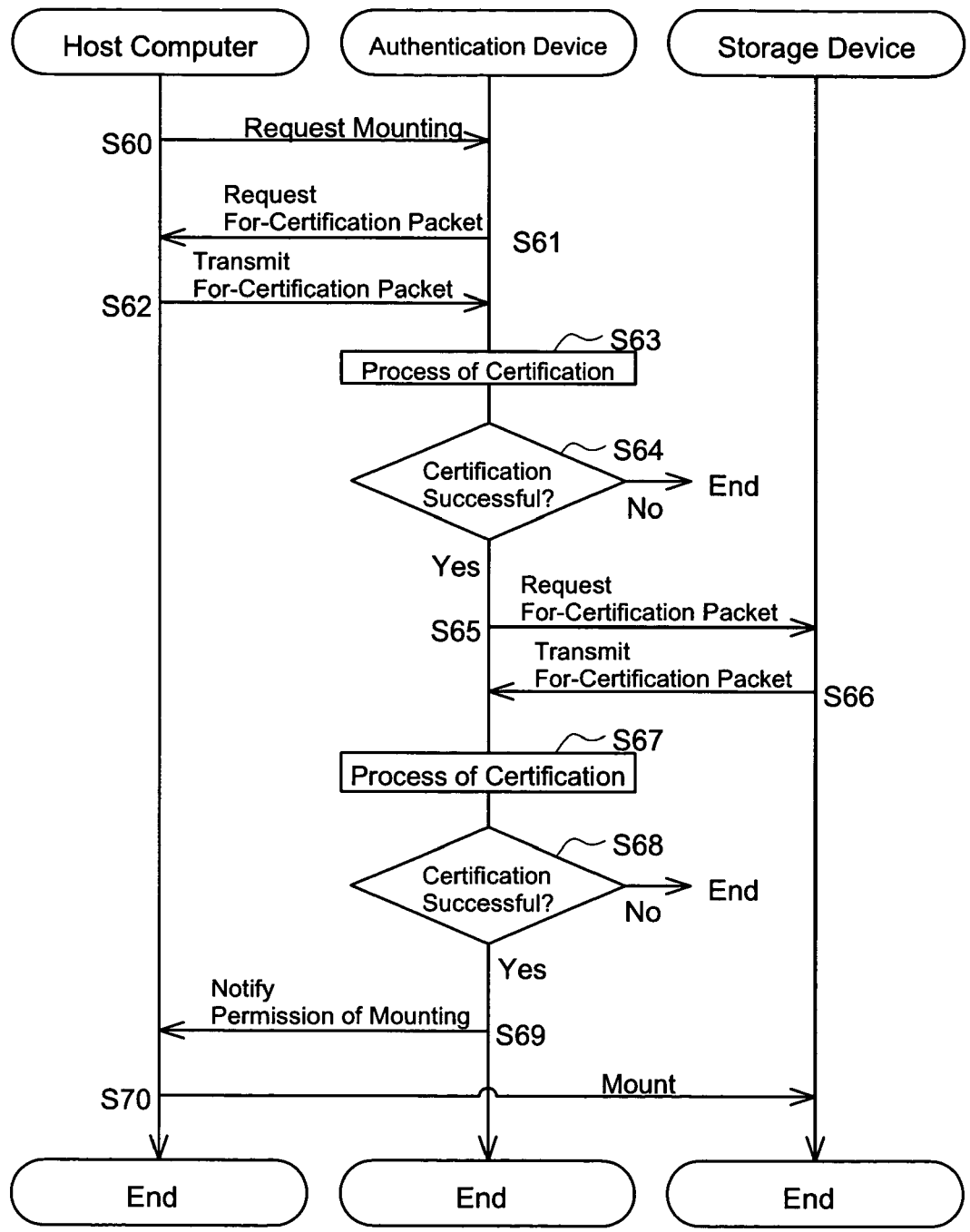
FIG. 13 is a flowchart illustrating a process of certification upon mounting.

(C5) Process of Certification Upon Mounting:

FIG. 13 is a flowchart illustrating a process of certification upon mounting. The process of certification upon mounting is executed when the host computer 400 mounts the storage device 300. The following describes a case where the host computer 400 mounts the storage device ST1.

First of all, the host computer 400 designates the storage device ST1 and transmits an execution request of mounting to the authentication device 200 in step S60. The authentication device 200 then requests the host computer 400 to transmit a for-certification packet in step S61. In response to the request, the host computer 400 generates a for-certification packet and transmits the for-certification packet to the authentication device 200, in step S62.

Upon receipt of the for-certification packet from the host computer 400, the authentication device 200 executes the process of certification that is described above with respect to FIG. 10 in step S63. If the certification of the host computer 400 results in a failure, i.e. if NO is returned in step S64, the authentication device 200 ends the process of certification upon mounting. In other words, the host computer 400 is refused mounting of the storage device ST1.

If the certification of the host computer 400 is successful, i.e. if YES is returned in step S64, the authentication device 200 requests the storage device ST1 that has been designated in step S60 to transmit a for-certification packet in step 65. In response to the request, the storage device ST1 generates and returns a for-certification packet in step S66.

Upon receipt of the for-certification packet from the storage device ST1, the authentication device 200 executes the process of certification that is described above with respect to FIG. 10 in step S67. If the certification of the storage device ST1 results in a failure, i.e. if NO is returned in step S68, the authentication device 200 ends the process of certification upon mounting. This disables the host computer 400 to mount the storage device ST1.

If the certification of the storage device ST1 is successful, i.e. if YES is returned in step S68, the authentication device 200 notifies the host computer 400 of permission of the mounting in step 69. Upon receipt of the notification, the host computer 400 mounts a data storage region 355 of the storage device ST1 in step S70.

According to the above-described process of certification upon mounting, the host computer 400 can mount the storage devices 300 with properly issued certificates and thus can restrict tapping of data due to actions such as spoofing.

A variety of embodiments of the present invention are described above. According to the computer system 10 of the present embodiment, each device is strictly certified upon communication of data between the storage devices 300 and upon process of mounting between the host computer 400 and the storage device 300. This allows for restriction of leakages and tapping of data due to actions such as spoofing and enables the system to operate in security.

The above embodiments are not restrictive and there may be a variety of modifications, changes, and alternations without departing from the scope or spirit of the main characteristics of the present invention. For example, the functions that are implemented by software may alternatively be implemented by hardware.

What is claimed is:

1. A computer system comprising:
   a plurality of storage devices; and
   an authentication device,
   wherein each of the storage devices comprises:
      a certificate retaining module that retains a certificate, which has been issued by a certification authority and contains address information of the storage device; and
      a receiving module that receives a packet including the certificate and the address information of the storage device,
   wherein the authentication device comprises:
      a receiving module configured to receive a packet including address information of a source of the packet and a certificate of the source of the packet; and
      a certification processing module configured to validate the source of the packet based on a comparison of the address information of the source of the packet, which is included in the packet, and the address information that is recorded on the certificate in the packet, wherein when the comparison results in a match between the address information of the source of the packet and the address information recorded on the certificate in the packet, then the certification processing module validates the source of the packet, wherein upon receipt of a notification from a first storage device of an output of data from the first storage device to a second storage device, the receiving module of the authentication device receives the packet from each of the first storage device and the second storage device, and wherein the certification processing module of the authentication device validates each of the received packets, and if the validation is successful, notifies the first storage device of permission of the output of data.

2. A computer system comprising:

a plurality of storage devices; and an authentication device, wherein each of the storage devices comprises:

a certificate retaining module that retains a certificate, which has been issued by a certification authority and contains address information of the storage device; and a receiving module that receives a packet including the certificate and the address information of the storage device, wherein the authentication device comprises:

a receiving module configured to receive a packet including address information of a source of the packet and a certificate of the source of the packet; and a certification processing module configured to validate the source of the packet based on a comparison the address information of the source of the packet, which is included in the packet, and the address information that is recorded on the certificate in the packet, wherein when the comparison results in a match between the address information of the source of the packet and the address information recorded on the certificate in the packet, then the certification processing module validates the source of the packet, wherein upon receipt of a notification from a first storage device of an output of data from the first storage device to a second storage device, the receiving module of the authentication device receives the packet from each of the first storage device and the second storage device selected based on a predetermined condition, and wherein the certification processing module of the authentication device validates each of the received packets, and if the validation is successful, notifies the first storage device of the selected storage device and of permission of the output of data.

3. A computer system according to claim 2, wherein each of the storage devices is a SAN type storage device;

the certificate contains a fiber channel address of the storage device for which the certificate has been issued; and the certification processing module of the authentication device validates each of the received packets, and if the validation is successful, notifies the one storage device of the fiber channel address of the selected storage device and of permission of the output of data.

* * * * *